United States Patent [19]

Appleberry

[11] Patent Number: 5,088,662
[45] Date of Patent: Feb. 18, 1992

[54] KINETIC ENERGY WHEEL BRAKES

[75] Inventor: Walter T. Appleberry, Long Beach, Calif.

[73] Assignee: Rockwell International Corporation, El Segundo, Calif.

[21] Appl. No.: 448,460

[22] Filed: Dec. 11, 1989

[51] Int. Cl.$^5$ .............................................. B64C 25/42
[52] U.S. Cl. .................................. 244/111; 244/103 R; 301/6 A; 301/127; 280/661; 280/93
[58] Field of Search .............. 244/111, 103 R, 103 W; 301/6 A, 6 R, 127, 36 R, 13 SM; 280/661, 93, 94; 180/905, 906

[56] References Cited

U.S. PATENT DOCUMENTS

| | | | |
|---|---|---|---|
| 2,135,699 | 11/1938 | Campbell | 244/103 R |
| 2,351,935 | 6/1944 | Devlin et al. | 244/103 R |
| 2,644,654 | 7/1953 | Mercier | 244/103 R |
| 2,861,759 | 11/1958 | Wright | 244/103 R |
| 4,659,040 | 4/1987 | Sinclair | 244/111 X |

FOREIGN PATENT DOCUMENTS

| | | | |
|---|---|---|---|
| 453048 | 5/1913 | France | 244/103 R |
| 737057 | 12/1932 | France | 244/111 |
| 291831 | 2/1971 | U.S.S.R. | 244/111 |
| 524929 | 8/1940 | United Kingdom | 244/103 R |

Primary Examiner—Johnny D. Cherry
Assistant Examiner—James M. Kannofsky
Attorney, Agent, or Firm—Lawrence N. Ginsberg; Charles T. Silberberg

[57] ABSTRACT

A braking device for a vehicle utilizing a plurality of wheels for motion relative to a surface. The present invention includes a bent axle for supporting at least one of the wheels. The bent axle has a first axle portion being disposed parallel to a y-axis which is perpendicular to an x-axis, the x-axis defining the longitudinal axis of a main structure of the vehicle, the x-axis also defining the direction of vehicle motion. The bent axle includes at least one terminal axle portion angularly disposed from the first axle portion. The first axle portion of the bent axle rotatably engages with the main structure of the vehicle, along an axis parallel to the y-axis. The terminal axle portion of the bent axle rotatably engages with the wheel. Therefore, the wheel rotates in a plane that is not parallel to the direction of vehicle motion.

20 Claims, 3 Drawing Sheets

KINETIC ENERGY WHEEL BRAKES

BACKGROUND OF THE INVENTION

1. Field of the Invention

This invention relates to braking systems for vehicles and more particularly to a braking system which utilizes the braking component of the friction force provided during the use of non-parallel wheels.

2. Description of the Related Art

Hydraulic or pneumatic brakes which are typically used for vehicles can fail because of seal degradation, leakage and/or failure of other components due to the complexity of pressurized brakes. A number of special braking design methods have been proposed for increasing the reliability of braking systems and/or for providing emergency braking systems.

For example, U.S. Pat. No. 2,351,935 issued to L. J. Devlin, entitled "Emergency Braking Device", discloses an emergency braking device for an aircraft in which "toe-out" of the wheels is provided which serves as the source of a braking force. The toe-out is provided by a relatively complex mechanism automatically operable upon release to frictionally engage the tire of an aircraft landing wheel and cause the tire and wheel, by reason of their rotative force to travel in an arc about a substantially vertical wheel support.

The Devlin device requires numerous components, including for example, a steel cable, bell crank, and specially designed notched surfaces. To insure wheel toe-out, a spring-loaded cam rotates into the tire sidewall with the resulting friction force being used to initiate toe-out. (Use of this cam may be unsafe, increasing the chances of tire blowout.) Furthemore, there is not direct coordination of toe-out motion. One wheel could toe-out faster than the other, causing a yaw shock (a right or left steering anomaly).

Inasmuch as the Devlin device is directed to emergency applications, it cannot be modulated. It is either full-on or off. Toe-out occurs almost instantaneously, producing an enormous opening shock, very likely requiring the addition of a load snubber.

Devlin et al's use of toe-out as the only source of the braking force is inefficient because it requires a very large toe-out angle (20°), which may result in tire blow-out.

U.S. Pat. No. 2,538,389, entitled "Aircraft Landing Gear", issued to A. C. Smith, discloses an aircraft landing gear which deploys the skid under the wheel to provide friction at the runway/skid interface. The invention is intended for fixed main gear light aircraft and the skid system is used only for emergencies. In normal flight, the entire main gear of the Smith device is positioned for emergency use and must, for a normal landing, be rotated 90 degrees about the main gear struts. At the same time, the skid must also be rotated 90 degrees upward. The main gear complexity required for each normal landing is fraught with safety and reliability concerns as well as probable excessive cost and weight. In view of the above, there is a need for a simple, efficient braking device for use with vehicles utilizing wheels for vehicle motion relative to a surface.

SUMMARY OF THE INVENTION

The present invention is a braking device for a vehicle utilizing a plurality of wheels for motion relative to a surface. It is particularly adaptable for use with aircraft landing gear. In its broadest aspects, the present invention includes support means for supporting at least one of the wheels. The support means includes bent axle means. The bent axle means has a first axle portion being disposed parallel to a y-axis which is perpendicular to an x-axis, the x-axis defining the longitudinal axis of a main structure of the vehicle, the x-axis also defining the direction of vehicle motion. The bent axle means includes at least one terminal axle portion angularly disposed from the first axle portion. Means are provided for rotatably engaging the first axle portion of the bent axle means with the main structure of the vehicle, along an axis parallel to the y-axis. Means are provided for rotatably engaging the terminal axle portion of the bent axle means with the wheel. Therefore, with no braking, the wheel rotates in a plane parallel to the x-axis, but is canted slightly away (preferably one to three degrees) from the x-z plane. When fully braked, the wheel plane is parallel to the z-axis, but is canted slightly away from the x-z plane.

In its more narrower aspects, the present invention includes a unitary double stub axle having two symmetrically disposed terminal axle portions for supporting wheels. A linear actuator/lever combination is provided for rotating the axle relative to the vehicle so that "toe-out" of the wheels may be provided. The degree of toe-out and commensurate braking is achieved by adjusting the linear actuator to the desired length.

In the preferred embodiment a disc brake assembly is used in combination with the force provided by the toe-out to enhance braking efficiency. This takes advantage of the maximum friction force, which is always parallel to the outer axle bent portion. The present invention has several advantages over the prior art. It provides toe-out with a minimal number of easily fabricated components. The invention guarantees close coordination of toe-out, whether single or dual wheels are used at both main gear struts of the airplane.

It is completely adjustable. It can be applied/released repeatedly by the use of a reversible linear actuator. The brake force can be gradually increased or decreased in proportion to the angular movement of the lever extending from the one-piece axle that supports both wheels. The axle centerline is at the origin of the rolling radius and thus does not raise or lower the vehicle during its 90 degree stroke.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic of a dual wheel double stub axle configuration, with no toe-out or toe-in.

The same elements or parts throughout the figures are designated by the same reference characters while equivalent elements bear a prime designation.

DETAILED DESCRIPTION OF THE PREFERRED EMBODIMENTS

Figure 1A:
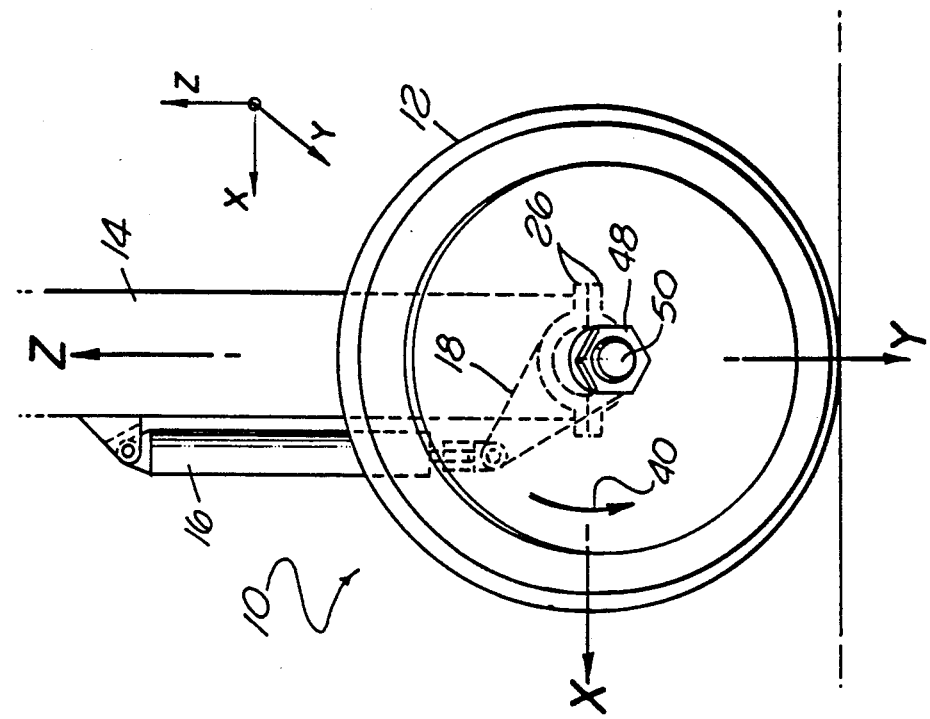
FIG. 1a is a side view of the embodiment of FIG. 1.
Figure 1:
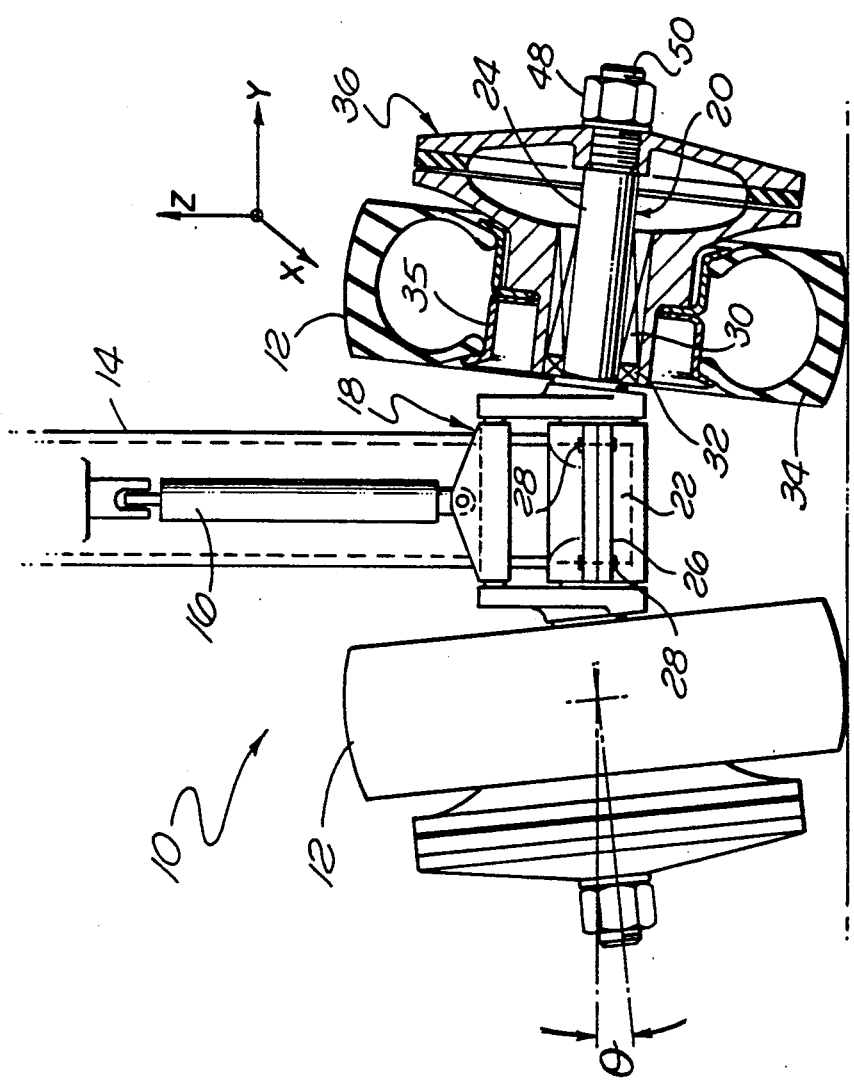
FIG. 1 is a view looking aft, partially in cross section, of the preferred embodiment of the present invention, utilizing a unitary double stub axle and disc brake, the embodiment being shown in a no-brake position.

Referring to the drawings and the characters of reference marked thereon, FIG. 1 illustrates the preferred embodiment of the present invention, designated generally as 10. In this Figure, a typical aircraft main landing gear is described for illustrative purposes; however, the principles of the present invention are not limited to aircraft applications and may be used for any vehicle using wheels for motion relative to a surface, and requiring a braking system for those wheels. A typical aircraft main landing gear uses dual wheels 12 at each of the two main struts 14 (only one strut 14 being illustrated in FIG. 1).

A linear actuator 16 is pivotally mounted to the upper end of the main strut 14. The lower end of the linear actuator 16 is connected to lever means 18, as best seen in FIG. 1a. The linear actuator may be, for example, a hot gas strut, spring activated actuator, or a controllable electro-mechanical actuator. Lever means 18 preferably includes two levers which are disposed about either side of the main strut 14. The lever means 18 is integral with a bent axle means 20 for supporting wheels 12.

Bent axle means 20 includes a bent axle having a central portion 22 disposed parallel to the y-axis, where the y-axis is defined in an x, y, z orthogonal coordinate system. The x-axis defines the longitudinal axis of the main structure of the aircraft and, concomitantly, the direction of motion. The y-axis is the horizontal axis and the z-axis is the vertical axis, as shown in the figures.

As noted above, the central portion 22 of the bent axle 20 is supported along the y-axis. The bent axle is preferably a unitary double stub axle having two symmetrically disposed terminal axle portions 24 angularly disposed from the central portion 22. The angle of disposition, $\theta$, is approximately 3 degrees, or within a range of 1-5 degrees. (The figures showing this angle are greatly exaggerated for clarity.)

The main strut 14 is welded to an upper of two opposing C-shaped flanges 26 of the bent axle 20. The flanges 26 are attached by means of bolts 28.

Relative rotation of the wheel 12 and axle 20 is accomplished through a main bearing 30 which supports the main load on the wheel and a thrust bearing 32 which takes the load along the axle 20. The wheel rims are shown, designated as 35, and conventional inflated tires are designated 34.

The present invention preferably includes a rotary friction brake assembly, designated generally as 36, the details of which will be discussed below.

Figure 2:
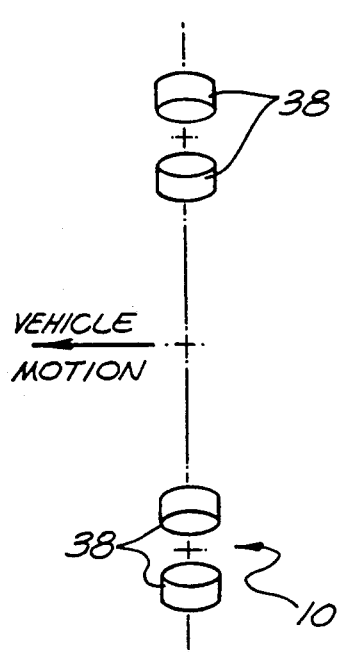

In the position illustrated in FIGS. 1 and 1a (no braking) the wheels are oriented so that the centerline of the wheel axle stub is in the vertical y-z plane. In this position, the braking component of the total friction force acting at the tire, where the tire touches the ground, is equal to zero. In other words, there is no "toe-out" of the wheels. This position is schematically illustrated in FIG. 2 in which dual wheels 38, at each of the two main struts of a typical aircraft main landing gear, are shown.

Figure 1C:
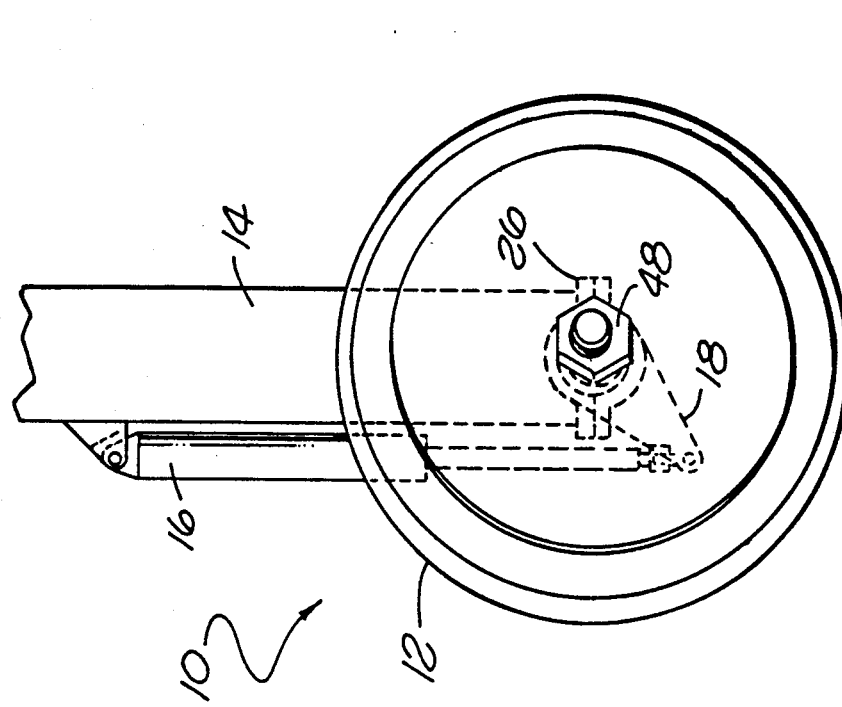
FIG. 1c is a side view, partially in cross section, of the position illustrated in FIG. 1b.
Figure 1B:
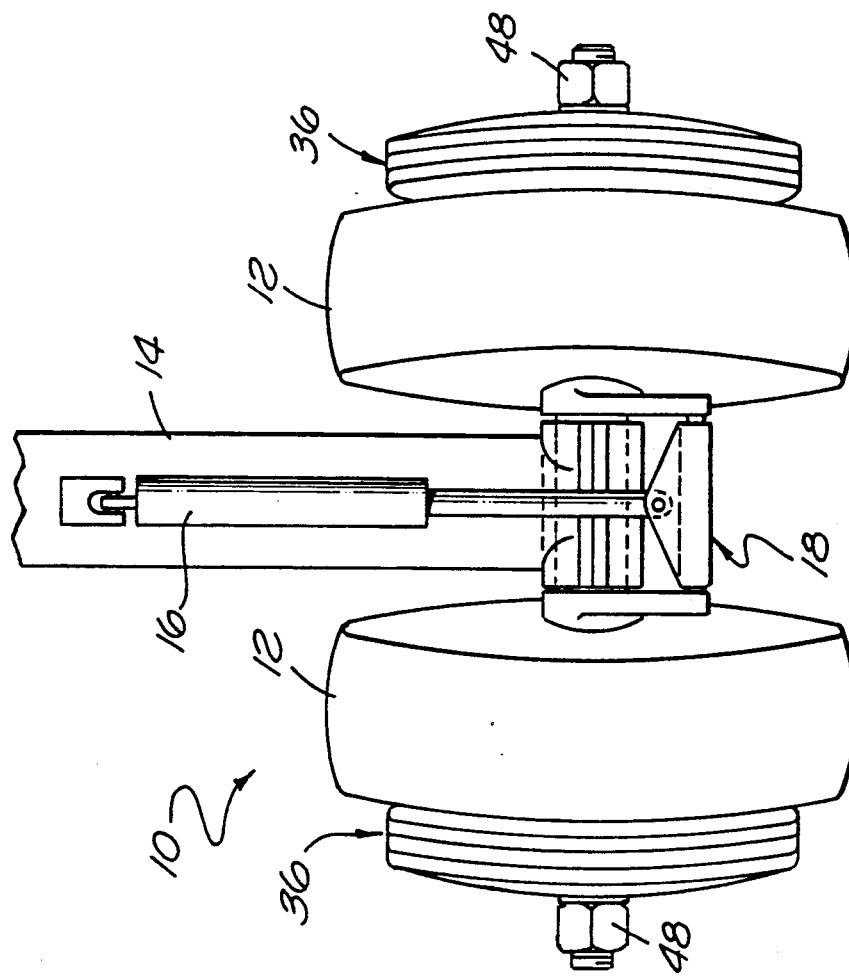
FIG. 1b illustrates the preferred embodiment of FIG. 1 after braking has commenced and the wheels are in a full toe-out position.
Figure 2A:
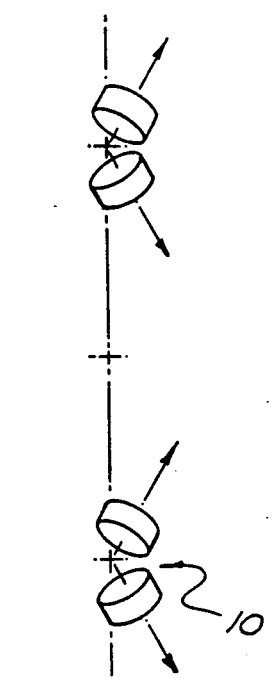
FIG. 2a is a schematic illustration of the embodiment of FIG. 2 in a toe-out configuration.

When braking is commenced, the lower end of the linear actuator 16 pushes lever 18 in the direction shown by arrow 40 in FIG. 1a. As lever 18 rotates, toe-out of the wheels progresses from zero to full (i.e. 90 degree rotation of axle 20 and lever 18). The full toe-out position is illustrated in FIGS. 1b, 2a and 1c. In this position, the levers 18 move downward so that bent axle 20 is now completely disposed on the x-y plane. The central portion 22 of the bent axle 20 remains at a constant height relative to the ground 42. Toe-out is at approximately 3 degrees.

The friction force generated at the runway surface is maximum along a line parallel to the canted axle. The direct braking component, $F_{bd}$, of this axial force may be represented by the following equation:

$$F_{bd}=(W/n)f\sin\theta \quad (1)$$

Where W is the total vehicle weight at the main gear, n is the total number of main gear wheels, f is the runway/tire coefficient of friction, and $\theta$ is the wheel toe-out angle.

Now, assuming that W=12,000 pounds mass, n=4, and f=0.30, the equation reduces to:

$$F_{bd}=900\sin\theta \quad (2)$$

$F_{bd}$ increases directly with the sine of $\theta$ and is that component of the 900-pound maximum friction force at the runway/tire interface that is parallel to the x-axis, i.e., in the direction of vehicle motion.

The maximum friction force of 900 pounds at the same runway interface is parallel to the axle and is reacted by the disc brake assembly. The braking component of this force, i.e., in the direction of vehicle motion, is a function of the cosine of $\theta$, as will be further explained below.

Referring again to FIG. 1, a preferred embodiment of the rotary friction brake assembly 36 will now be described. Use of this secondary source of braking force provides better use of the maximum available friction force. Brake assembly 36 includes a rotor 42 fixedly attached to the wheel 12, a stator 44 fixedly attached to the bent axle 20, and one brake pad 46 disposed therebetween and fixedly attached to the stator 44. The disc brake assembly 36 is secured to the bent axle 20 by retainer nut 48 and spline 50.

A key feature of the toe-out friction is that the maximum force is, in theory, constant, and independent of any toe-out angle greater than zero, assuming the axle is parallel to the ground plane where gravity effects are zero. The braking component of this force, however, is related to the toe-out angle, $\theta$, as seen in equations 1 and 2. For example, at 3 degrees toe-out, $F_{bd}$ is 47.1 pounds-force, a relatively small portion of the 900 pounds-force along the axle.

Better use of this available force can be made by bootstrapping. A disc brake is added outboard of the wheel that is energized or bootstrapped by the 900-pound maximum toe-out friction force. The resulting indirect braking force is (at $\theta=3$ degrees toe-out):

$$F_{bi}=F_f(R_m/R_w)\cos\theta=540\cos\theta=539.3 \text{ lbf},$$

where $F_f$ is the 900-pound axial force, $R_m$ is the 4.5-inch mean disc brake pad radius, and $R_w$ is the 7.5-inch tire rolling radius. The total braking force per wheel is $$F_{bd}+F_{bi}=47.1+539.3=586.4 \text{ pounds.}$$

$F_{bi}$ is relatively insensitive to $\theta$, losing only 47.1 pounds (about 8 percent of total braking), as $\theta$ changes from 3 to 40 degrees. Without bootstrapping, this total would require 40 degrees of toe-out instead of 3, greatly increasing tire damage and the risk of catastrophic main gear failure. Thus, the advantages of the present invention are optimized by use of the friction disc brake assembly 36, which allows a sharply reduced toe-out angle and, consequently, reduced tire wear.

Figure 3:
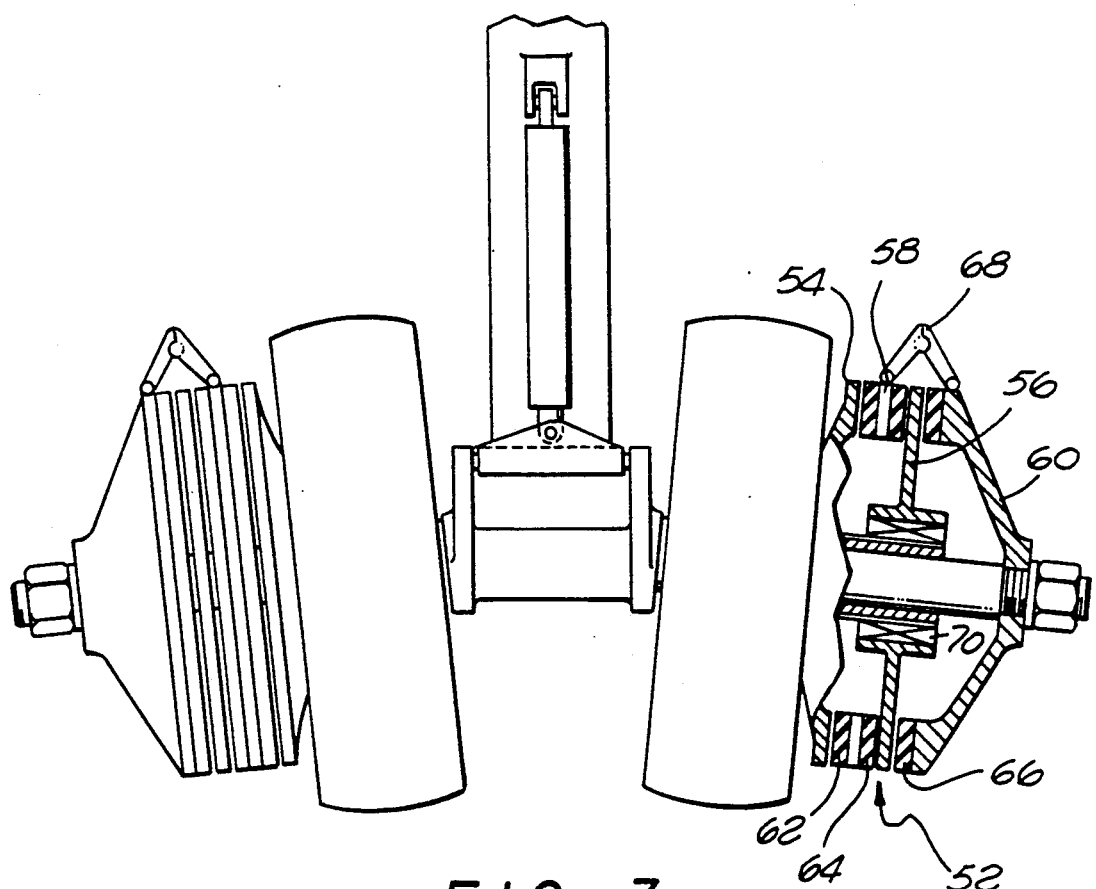
FIG. 3 is an alternate embodiment of the braking device of the present invention, utilizing a multiple disc brake assembly.

Referring now to FIG. 3, a second embodiment of a disc brake assembly is illustrated, designated generally as 52. Multiple disc brake assembly 52 includes an inner rotor 54, an outer rotor 56, inner stator 58, an outer stator 60, an inner brake pad 62, an intermediate brake pad 64, and an outer brake pad 66. Brake pads 62, 64 are attached to either side of inner stator 58. Outer brake pad 66 is attached to outer stator 60. The inner stator 58 is connected to the outer stator 60 through three equally disposed elbow linkages 68.

A bearing assembly 70 provides the required support and rotation of outer rotor 56. Utilization of three friction surfaces as provided by multiple disc brake assembly 52, effectively triples the braking effect, when compared to the embodiment illustrated in FIGS. 1 to 1c.

Figure 2B:
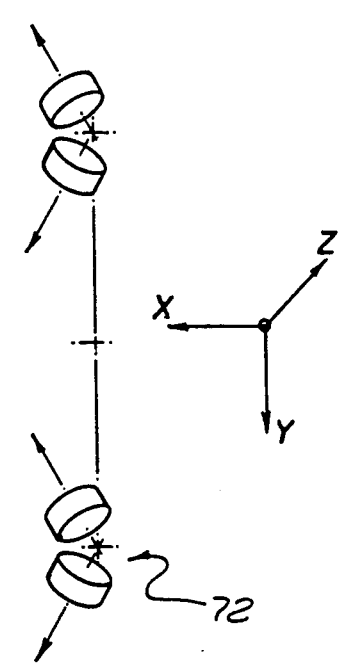
FIG. 2b shows the toe-in position.

Referring now to FIG. 2b, yet another embodiment of the present invention is illustrated, designated generally as 72. FIG. 2b shows that instead of utilizing a toe-out configuration, the wheels may be oriented in a toe-in fashion. Such a configuration can be achieved by reversing the lever 18 and actuator 16, shown in FIGS. 1 and 1a, from the front of the main strut 14 to the rear of main strut 14. This embodiment is similar to the toe-out of the preferred embodiment, except that the direction of the axial friction force is reversed, thus requiring positioning of the disc brake inboard of the wheel. (This could be a disadvantage since the wheel must be farther from the main strut in order to make room for the disc assembly, thus increasing bending stresses in the cantilever axle and therefore, weight.)

Other rotary friction brake assemblies may also be utilized, for example, a conical brake assembly (not illustrated). Such a conical brake pad assembly would preferably use a conical shape of approximately 60 degrees. The conical configuration has the advantage of higher force for a given axial input load. It has the disadvantage of higher cost.

Although all previous embodiments have utilized a double stub axle, it is within the purview of the present invention to include a bent axle means having a single stub axle. The above principles apply equally in this instance.

Obviously, other modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A braking device for a vehicle having a main structure with a longitudinal axis, x, defining the direction of vehicle motion, a perpendicular axis, y, and a vertical axis, z, the axes x, y, z defining an orthogonal coordinate system, said vehicle utilizing a plurality of wheels for motion thereof relative to a surface, each wheel having an axis of rotation, comprising:

support means for supporting at least one of said wheels, said support means including;

(a) bent axle means, said bent axle means being unitary, one piece and having a first axle portion being disposed parallel to said y-axis and at least one terminal axle portion angularly disposed from said first axle portion,
 (b) means for rotatably engaging the first axle portion of said bent axle means, relative to said main structure, about an axis parallel to said y-axis, and
 (c) means for rotatably engaging said at least one terminal axle portion of said bent axle means with said at least one wheel, said wheel thereby rotating in a plane that is not parallel to the direction of vehicle motion.

2. The braking device of claim 1 wherein said means for rotatably engaging said first axle portion includes:

(a) a linear actuator having a first end pivotally mounted to said main structure, and a second end; and
 (b) lever means connected to said second end of the linear actuator, said lever means being integral with said bent axle means for translating said linear motion of said linear actuator to rotary axle motion.

3. The braking device of claim 2 wherein said linear actuator is adjustable so as to incrementally adjust the braking force.

4. The braking device of claim 1 wherein said bent axle means includes a single stub axle.

5. The braking device of claim 1 wherein said bent axle means includes a unitary double stub axle, said double stub axle having two symmetrically disposed terminal axle portions.

6. The braking device of claim 1 wherein said support means includes:

a unitary double stub axle, said double stub axle having two symmetrically disposed terminal axle portions for supporting at least two opposing wheels; and
 adjustment means for modulating the angular disposition of said terminal axle portions relative to said main structure.

7. The braking device of claim 6 wherein said adjustment means provides "toe-out" disposition of said wheels relative to the direction of vehicle motion.

8. The braking device of claim 6 wherein said adjustment means provides "toe-in" dispositon of said wheels relative to the direction of vehicle rotation.

9. The braking device of claim 1 further including a rotary friction brake assembly including at least one stator, one rotor, and one brake pad disposed therebetween, said stator being fixedly attached to said bent axle means and said rotor being fixedly attached to said wheel.

10. The braking device of claim 9 wherein said rotary friction brake assembly includes a disc brake assembly.

11. The braking device of claim 10 wherein said disc brake assembly includes a single brake pad.

12. The braking device of claim 10 wherein said disc brake assembly includes a plurality of brake pads.

13. A braking device for a vehicle having a main structure with a longitudinal axis, x, defining the direction of vehicle motion, a perpendicular axis, y, and a vertical axis, z, the axes x, y, z defining an orthogonal coordinate system, said vehicle utilizing a plurality of wheels for motion thereof relative to a surface, each wheel having an axis of rotation, comprising:

(a) first braking means for providing a first source of braking, said first braking means including means for adjusting at least one of said wheels to a position sufficiently non-parallel to said x-axis so as to create a substantial braking component of the resulting friction force; and (b) second braking means connected to said first braking means for providing a second source of braking, said second source being a rotary friction brake assembly energized by said first braking means.

14. The braking device of claim 13 wherein said first braking means includes:

(a) unitary double stub axle having a central portion, and (b) two symmetrically disposed terminal axle portions angularly disposed from said central portion, said terminal axle portions for supporting at least two wheels.

15. The braking device of claim 14 wherein first braking means further includes:

(a) a linear actuator having a first end pivotally mounted to said main structure, and a second end; and (b) lever means connected to said second end of the linear actuator, said lever means being integral with said double stub axle for translating the linear motion of said linear actuator to rotary axle motion.

16. The braking device of claim 15 wherein said rotary friction brake assembly includes a disc brake.

17. A braking device for an aircraft utilizing main struts to support landing gear wheels, said aircraft having a longitudinal axis, x, a perpendicular axis, y, and a vertical axis, z, the axes x, y, z, defining an orthogonal coordinate system, said braking device comprising:

(a) a unitary double stub axle supported by a main strut, said double stub axle having a central portion and two symmetrically disposed terminal axle portions angularly disposed from said central portion, said terminal axle portions for supporting said wheels; and (b) means for rotating said double stub axle so as to adjust the amount of "toe-out" of the wheels.

18. The braking device of claim 17 wherein said means for rotating said double stub axle includes:

(a) a linear actuator having a first end pivotally mounted to said main strut, and a second end; and (b) lever means connected to said second end of the linear actuator, said lever means being integral with said double stub axle for translating the linear motion of said linear actuator to rotary axle motion.

19. The braking device of claim 18 further including a rotary friction brake assembly connected to each terminal axle portion of said double stub axle.

20. The braking device of claim 19 wherein said rotary friction brake assembly includes a disc brake assembly.

* * * * *